United States Patent
Keinath et al.

(10) Patent No.: US 10,402,226 B2
(45) Date of Patent: Sep. 3, 2019

(54) MEDIA ANALYSIS AND PROCESSING FRAMEWORK ON A RESOURCE RESTRICTED DEVICE

(71) Applicant: Apple Inc., Cupertino, CA (US)

(72) Inventors: Albert Keinath, Sunnyvale, CA (US); Ke Zhang, San Jose, CA (US); Yunfei Zheng, Cupertino, CA (US); Shujie Liu, Cupertino, CA (US); Jiefu Zhai, San Jose, CA (US); Chris Y. Chung, Sunnyvale, CA (US); Xiaosong Zhou, Campbell, CA (US); Hsi-Jung Wu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 90 days.

(21) Appl. No.: 15/173,047

(22) Filed: Jun. 3, 2016

(65) Prior Publication Data

US 2016/0357605 A1    Dec. 8, 2016

Related U.S. Application Data (60) Provisional application No. 62/171,957, filed on Jun. 5, 2015.

(51) Int. Cl.
*G06F 9/46*    (2006.01)
*G06F 9/50*    (2006.01)
(Continued)

(52) U.S. Cl.
CPC .......... *G06F 9/5011* (2013.01); *G06F 9/4881* (2013.01); *H04L 67/34* (2013.01); *H04N 21/41407* (2013.01); *H04N 21/4433* (2013.01)

(58) Field of Classification Search
None
See application file for complete search history.

(56) References Cited

U.S. PATENT DOCUMENTS 6,105,053 A  *  8/2000  Kimmel ................ G06F 9/5083
                                                    718/102
6,480,861 B1 *  11/2002  Kanevsky ................ G06F 9/50
                        (Continued)

FOREIGN PATENT DOCUMENTS

CN        1589433 A      3/2005
CN      102841810 A     12/2012
              (Continued)

OTHER PUBLICATIONS

"OS-Scheduling Algorithms"; http://www.tutorialspoint.com/operating_system/os_process_scheduling_algorithms.htm; accessed Oct. 18, 2016; 3 pages.

(Continued)

*Primary Examiner* — Bradley A Teets
(74) *Attorney, Agent, or Firm* — BakerHostetler LLP (57) ABSTRACT

A system for processing media on a resource restricted device, the system including a memory to store data representing media assets and associated descriptors, and program instructions representing an application and a media processing system, and a processor to execute the program instructions, wherein the program instructions represent the media processing system, in response to a call from an application defining a plurality of services to be performed on an asset, determine a tiered schedule of processing operations to be performed upon the asset based on a processing budget associated therewith, and iteratively execute the processing operations on a tier-by-tier basis, unless interrupted.

36 Claims, 3 Drawing Sheets

(51) Int. Cl.
　　*G06F 9/48*　　　　(2006.01)
　　*H04L 29/08*　　　(2006.01)
　　*H04N 21/443*　　(2011.01)
　　*H04N 21/414*　　(2011.01)

(56) References Cited

U.S. PATENT DOCUMENTS

| | | | |
|---|---|---|---|
| 8,327,365 B2 | 12/2012 | Sandoz et al. | |
| 8,627,123 B2* | 1/2014 | Jain | G06F 1/3209 |
| | | | 713/310 |
| 8,924,981 B1 | 12/2014 | Brown et al. | |
| 9,223,529 B1* | 12/2015 | Khafizova | G06F 3/1204 |
| 2002/0159640 A1* | 10/2002 | Vaithilingam | G06F 17/30038 |
| | | | 382/218 |
| 2003/0101084 A1 | 5/2003 | Otero | |
| 2005/0071843 A1* | 3/2005 | Guo | G06F 9/505 |
| | | | 718/101 |
| 2005/0249199 A1* | 11/2005 | Albert | H04L 67/1008 |
| | | | 370/352 |
| 2009/0070762 A1 | 3/2009 | Franaszek et al. | |
| 2011/0313902 A1* | 12/2011 | Liu | G06Q 10/06 |
| | | | 705/34 |
| 2014/0280726 A1* | 9/2014 | Tuzi | H04L 69/03 |
| | | | 709/217 |
| 2015/0088816 A1* | 3/2015 | Kruglick | H04L 47/38 |
| | | | 707/610 |
| 2015/0249928 A1* | 9/2015 | Alicot | G06F 9/4416 |
| | | | 370/315 |
| 2015/0268988 A1* | 9/2015 | Declercq | G06F 9/542 |
| | | | 718/108 |
| 2016/0285720 A1* | 9/2016 | Maenpaa | H04L 65/605 |

FOREIGN PATENT DOCUMENTS

| | | |
|---|---|---|
| EP | 0880095 A2 | 11/1998 |
| WO | 20031044655 A2 | 5/2003 |

OTHER PUBLICATIONS

European Patent Application No. 16173120.3; Extended Search Report; dated Oct. 24, 2016; 7 pages.

* cited by examiner

MEDIA ANALYSIS AND PROCESSING FRAMEWORK ON A RESOURCE RESTRICTED DEVICE

CLAIM FOR PRIORITY

This application benefits from priority of application Ser. No. 62/171,957, filed Jun. 5, 2015 and entitled "Media Analysis and Processing Framework on a Resource Restricted Device," the disclosure of which is incorporated herein in its entirety.

BACKGROUND OF THE DISCLOSURE

The disclosure relates to a system and method for media analysis and processing framework on a resource restricted device.

A media analysis and processing framework provides a suite of tools within devices to compute descriptors for media assets stored by the terminal. Typically, the terminal has limited resources which may cause descriptor computations to be stalled or aborted due to resource constraints.

Accordingly, there is a need for a system and method to schedule computational methods according to processing budget identifiers that indicate time for computation, expected complexity and other factors.

DETAILED DESCRIPTION

Embodiments of the present disclosure provide a system and method for processing media on a resource restricted device. In response to a call from an application identifying media assets to be processed, identifiers to be performed on the media assets, and a processing budget associated with the call, a tiered scheduled of processing operations may be generated. On a batch-by-batch basis, a batch of processing operations may be performed based on the tiered schedule that has been generated. In addition, the resources available for a next batch of processing operations may be determined. If there are insufficient resources available for the next batch of processing operations, the tiered schedule may be interrupted. If there are sufficient resources available for the next batch of processing operations, however, the next iteration may be performed based on the tiered schedule.

Figure 1:
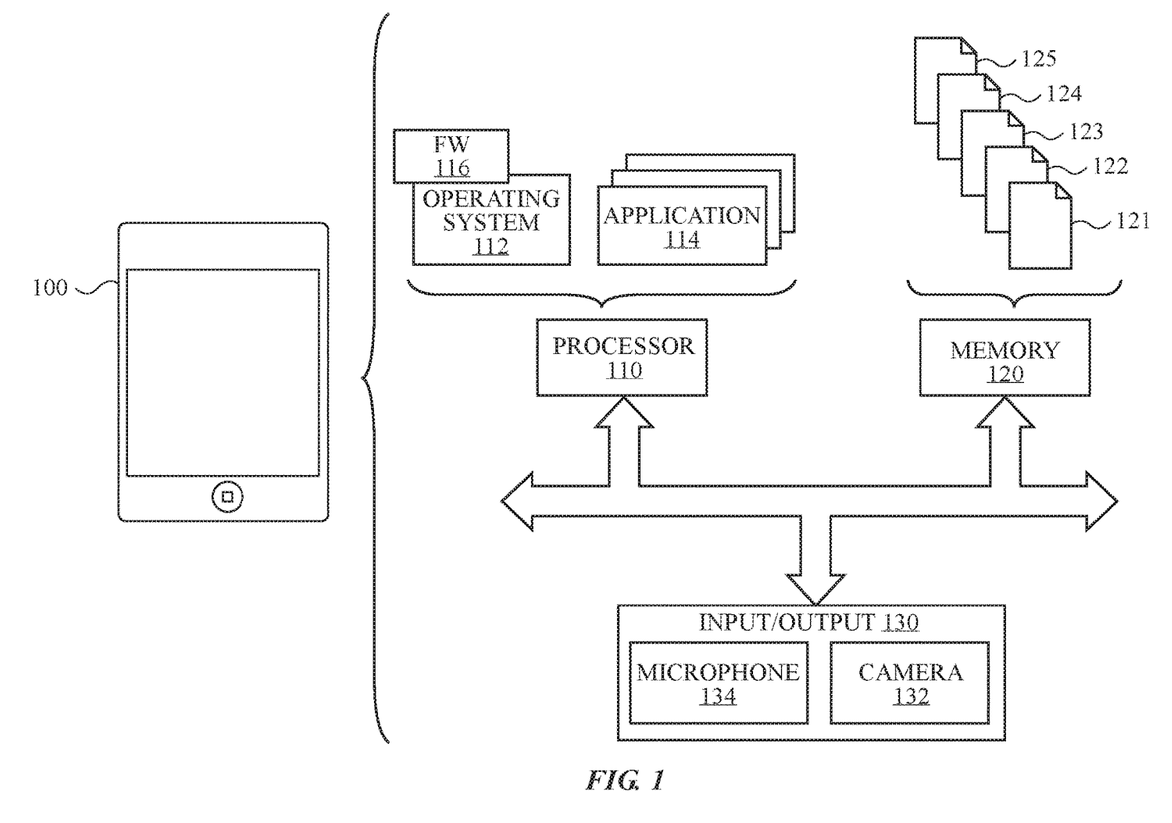
FIG. 1 illustrates a block diagram of a terminal according to an aspect of the present disclosure.

FIG. 1 is a block diagram of a terminal 100 according to an embodiment of the present disclosure. The terminal 100 may include a processor 110, a memory system 120, and an input/output system 130. The processor 110 may execute program instructions representing an operating system 112 and one or more applications 114. The program instructions may be stored by the memory system 120 and read to the processor 110 for execution. The processor 110 can be, for example, a central processing unit, a microprocessor, a programmable logic array (PLA), a programmable array logic (PAL), a generic array logic (GAL), a complex programmable logic device (CPLD), an application-specific integrated circuit (ASIC), a field-programmable gate array (FPGA), or any other programmable logic device (PLD) that executes program instructions and facilitates the transmission of data.

The memory system 120 represents a hierarchical system of storage devices, which may include random access memories resident on the processor 110, near term storage devices and long term archival memories. The memory system 120 may include electrical-, magnetic- and/or optical-storage devices as may be convenient. The memory system 120 may include a database system (not shown). As is relevant to the present discussion, the memory system 120 may include media assets 121-125, which may include digital images, videos and/or graphic files (with accompanying audio, as may be convenient). The memory system 120 may store, in addition to data representing media assets 121-125 and associated blob descriptors, program instructions representing operating system 112, an application 114, and a media analysis and processing framework 116. The memory system 120 may be an internal memory or a removable storage type such as a memory chip. The memory system 120 may store information about the terminal 100.

The input/output system 130 may include input/output devices to accept commands from terminal operators and output data to them. Common input devices include camera systems 132 to capture video and/or still image, microphone systems 134 to capture ambient audio either in conjunction with or independently from the camera's output. Other input devices may include buttons, keyboards, mice and/or touch screens to accept user commands. They also may include accelerometers, gyroscopes and the like to determine position and/or orientation of the terminal 100. Common output devices (not shown) include display devices to render video output to an operator and speakers to output audio to the operator.

The operating system 112 may include instructions that define a media analysis and processing framework 116. The media analysis and processing framework 116 may be a software unit executed by the processor 110 that may provide a suite of tools within the terminal 100 to compute Binary Large OBject descriptors ("blob descriptors," for short) for media assets 121-125 stored by the terminal 100. Blobs may be large files for storing binary data stored in a database and transmitted as a single entity. For example, large amounts of data which may be inefficient to store and transmit as strings and numbers may use large data types like blobs. Blobs may be used to store and transmit large files such as images, video, audio, and the like. The blobs may also be a mixture of multiple types of files. In an aspect, the data stored in a blob may be semi-structured or unstructured. XML files may use semi-structured data, and multimedia files may use unstructured data, for example. Because blobs may store data for larger file types, they may require a significant amount of memory and processing power.

Oftentimes, the processing resources that are available at a terminal 100 will vary based on the type of terminal in which the embodiments discussed herein will be applied. Processing of blobs may also be distributed across multiple terminals and/or devices. Different versions of a given analysis may be performed depending on which resources may be available. For example, a hardware assist may be used when one is available. In another aspect, higher priority assets may be given more resources and/or processed before lower priority assets, which may be throttled due to a low priority and/or limited resources. Moreover, the types of input/output devices also may vary based on the types of terminal 100 being used. For the purposes of the present discussion, differences among the terminals are immaterial unless discussed herein.

As discussed, a media analysis and processing framework 116 may provide a suite of tools within the terminal 100 to compute blob descriptors for media assets stored by the terminal 100. Specifically, the media analysis and processing framework 116 may provide services that compute various blobClasses (descriptors, metadata, processed output, etc.) for a set of media assets and stores the blobs in a database. The services may be tiered so that blobs are produced in order according to a processing budget identified by a requesting application (a client). Classes like blobClasses may also represent a set of analyses which may be performed on an asset or subset of an asset.

The use of blobs may also be useful for playback functionality such as Pause & Resume functions. Even if a blob has not yet been completed or has been at least partially blacklisted, partial presentation of a blob may also be available.

Figure 2:
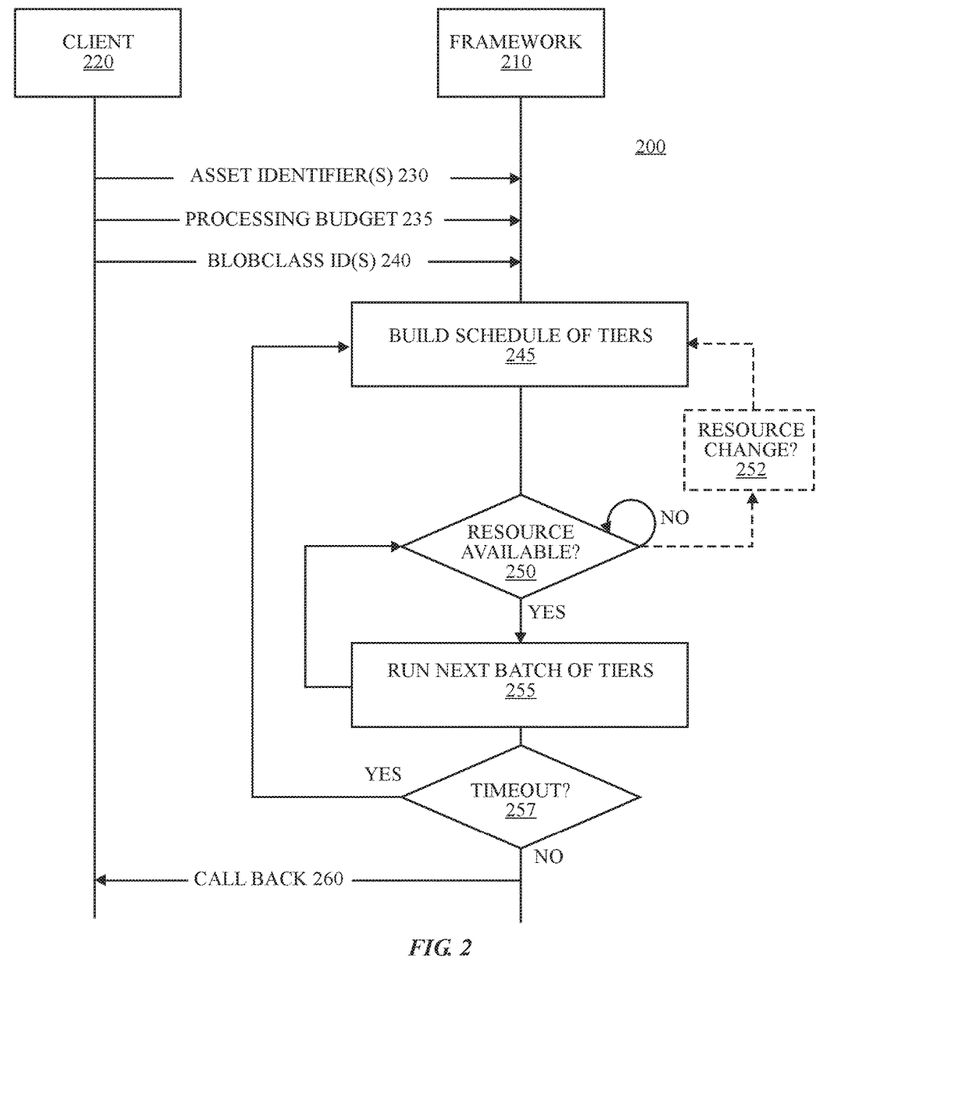
FIG. 2 illustrates interaction between the media analysis and processing framework and a client according to an aspect of the present disclosure.

FIG. 2 illustrates interaction 200 between the media analysis and processing framework 210 and a client 220. A client 220 may identify a set of assets to be processed (msg. 230), a processing budget per asset (msg. 235) and a set of blobClasses to be generated for the assets (msg. 240). The assets may be video, audio, images, or the like, and the blobClasses for each of the assets may contain relevant binary data for the assets. The processing budget per asset may depend on the characteristics of the processor 110 on the terminal 100 or other characteristics of the terminal 100 and/or a wireless network.

The media analysis and processing framework 210 may configure a schedule of tiers based on the processing budget (box 245) in response to a call from an application 114. The media analysis and processing framework 210 may determine whether there are sufficient resources available to execute the tiers in order on a tier-by-tier basis according the schedule (box 250). If not, the process may wait until there are sufficient resources to execute the schedule of tiers or may wait until a change in resources required or available is detected (box 252). If a change of resources is required or detected, the process may adjust the schedule of tiers. When sufficient resources are available, the process may execute the tiers in order according to the schedule as resources are available in the terminal (box 255). Resource availability may change based on device usage. For example, executing a video blob may require enough resources that the schedule of tiers needs to be adjusted to execute other tiers. Alternatively, a media asset may change and require a different amount of resources, which could also affect the schedule of tiers and the order in which assets are executed.

The process may also determine if a timeout has occurred (box 257). If so, the schedule of tiers may be adjusted. If not, the process may continue. Blob results can be returned in a callback to the client (msg. 260). For example, if the processing budget is too low for a blob corresponding to video data, the schedule of tiers may prioritize a blob corresponding to audio data with a smaller size and execute the audio blob before the video blob.

In an aspect, the processing budget 235 may be expressed as blobPriority, a value describing the priority of blobs to the client 220, and expectedDelay, representing a time delay after which the blob descriptors should be produced. The blob descriptors (msg. 240) may identify a set of blobClasses to be calculated from among a list of blobClasses supported by the media analysis and processing framework 210 per asset type. For example, blobClasses may differ based on various asset types like audio, image, video, and the like.

The schedule may collect a plurality of tiers to be performed on the assets. The tiers may differ based on the type of asset. Typically, the schedule may be organized by a completion priority such as CompletionPriority which can depend on an time delay such as expectedDelay, and a blob priority such as blobPriority, as well as a value representing the complexity of computing the blob descriptors, an identification of resource limitations of the host device, any dependencies among the blob descriptors, and common operations used in computing the blobs. In one aspect, a video blob descriptor may be more complex than an image blob descriptor, so the time delay for each type of descriptor may differ, and the completion priority of each type of descriptor may differ and depend on the type of descriptor.

In another aspect, when a client 220 requests a non-existing blob or not yet existing blob, if the expectedDelay is short, the media analysis and processing framework 210 may configure a set of tiers to best match the expectedDelay given the blobPriority, and schedule the tiers immediately. Otherwise if delayed computation is permissible, the media analysis and processing framework 210 may (1) schedule the tiers to operate at a time when the resource conditions are better (more resources available, device is powering, etc.) and may run the tiers at that time.

In another aspect, the task scheduling may be adjusted dynamically based on device conditions (e.g., device temperature and resource contention) and its status is reported to the client 220. For example, as available resources on the terminal 100 change, the task scheduling may be reorganized to prioritize video blobs over image or audio blobs if more resources become available on the terminal 100. In such an example, if video blobs reduce the amount of resources available on the terminal 100, the schedule may be adjusted to prioritize audio and image blobs until more resources become available. Other adjustments are contemplated based on various resource factors.

In another aspect, each tier may represent a collection of blobClass computations that fall within a range of CompletionPriority values. Generally, the computations within a tier share the overhead of working on an asset, such as, fetching, decoding, scaling, or other types preprocessing.

Each blobClass computation can have a number of methods that compute the blobs. These methods may differ from one another in terms of accuracy of the result and computational complexity. The media analysis and processing framework 210 may compute a blob across a number of tiers using different methods, each tier refining/improving the blob results. When operating on a blob, the media analysis and processing framework 210 may not need to invoke methods previously invoked, unless the blob has changed between the time the previous methods were operable and the time the present methods are being conducted. For some blobs, the results of one method can provide a starting point for the next method.

In one implementation, different asset types may have different blobPriority values, and the media analysis and processing framework 210 may schedule tiers to operate at different times on these different assets based on their blobPriority values. For example, digital photographs may have higher blobPriority values than videos or audio recordings, and the media analysis and processing framework 210 may schedule tiers to operate on them exclusively in a first portion of the schedule. The blobPriority values may depend on how large the different asset types are and what resources are available. For example, the media analysis and processing framework 210 may schedule videos and/or audio recordings at a later time or when resources contentions are at a low state.

In an aspect, the media analysis and processing framework 210 may schedule tiers to compute blobs for videos on lower spatial or temporal resolution renderings of the assets. Later-scheduled tiers may operation on higher resolution renderings, as resources permit. As such, the tiers may be organized within the asset type based on characteristics of individual blobs within the asset type. In such an aspect, the scheduling may organize not only based on asset types, but within the asset types based on resource availability and the like.

In another aspect, when there are multiple clients in a single device (not shown), each client can register (future) service requests though the media analysis and processing framework 210 with the parameters described above. Based on the priority of the clients, these parameters and resource availability, the media analysis and processing framework 210 may configure an ordered set of tiers to run.

In another aspect, if an asset is altered (e.g. edited) after scheduling a tier, the media analysis and processing framework 210 may revise the schedule to account for new processing to be performed.

In one example, the interaction 200 may occur on a smartphone. In such an example, the smartphone may have less resources available than a tablet or computer might have. As such, the smartphone may have a different schedule of tiers and may execute the interaction 200 differently than on the tablet or computer based on having less resources available.

In another example, the interaction 200 may occur on a computer. In such an example, the computer may have more resources available than a smartphone, and thus may be able to execute assets requiring more resources and/or more assets than a smartphone could. As such, the schedule of tiers and the execution of assets may differ from the way that the same assets may be executed on a smartphone or another device with different resource capabilities and restraints.

Figure 3:
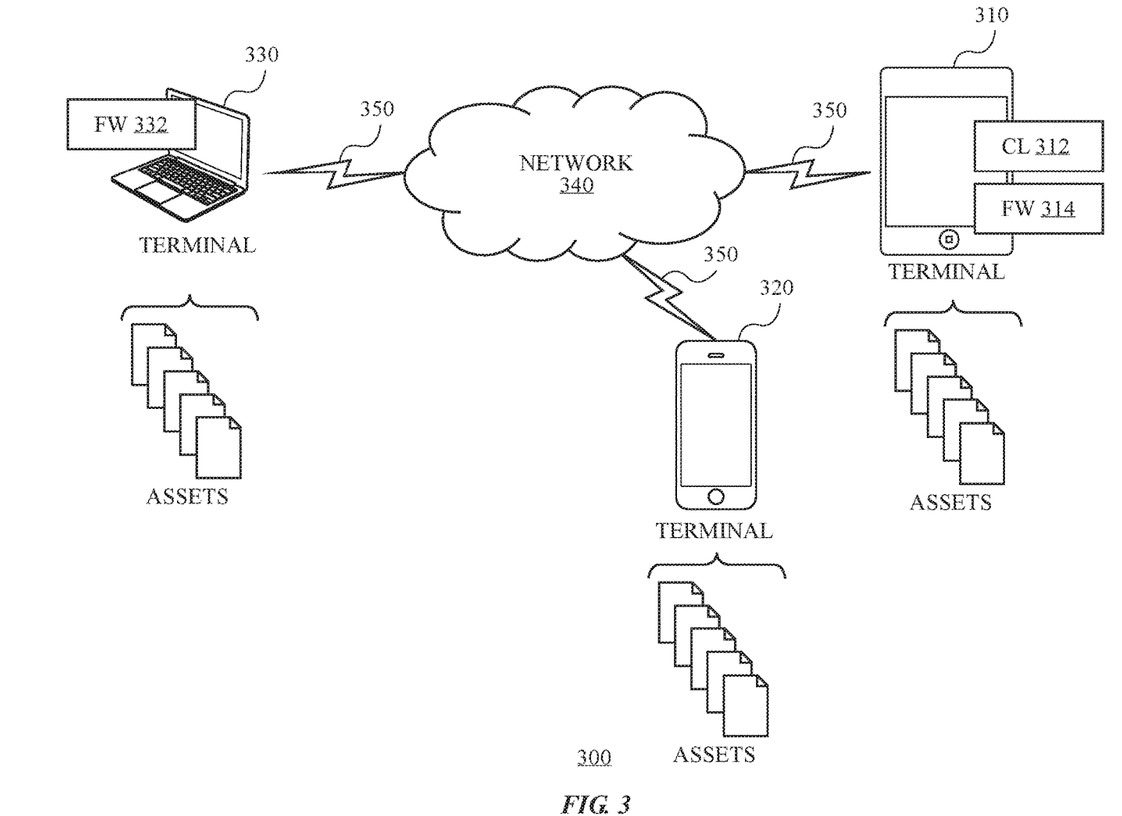
FIG. 3 illustrates a system according to an embodiment of the present disclosure that includes multiple terminals provided in mutual communication via a network.

The principles of the present disclosure also find application in a decentralized system 300 in which a framework run separately from a client 220 and perhaps where multiple terminals have access to a common set of media items.

FIG. 3 illustrates a system 300, according to an aspect of the present disclosure, that includes multiple terminals 310-330 provided in mutual communication via a network 340. The terminals 310-330 may access the network 340 via communication channels 350 as defined herein. The terminals 310-330 each may have access to a common set of assets.

In an aspect, a media analysis and processing framework 332 may run in one terminal 330 separate from a terminal 310 in which a requesting client 312 resides. The media analysis and processing framework 332 may operate on assets when its terminal 330 has sufficient resources available. In this case, the media analysis and processing framework 332 may use predefined values for the blobPriority and expectedDelay, but still configure an ordered set of tiers to run so that blobs can become available in a timely fashion.

In another aspect, the media analysis and processing framework can be distributed across a number of devices (shown as processing framework 314, 332) that have access to a common set of assets based on the availability of other co-computing devices in the network, their capabilities, and the network condition. Tier scheduling may distribute operation of tiers and/or methods among the different terminals 310, 330 that support the framework. Moreover, tiers may be transferred from one terminal 310 to another terminal 330 so that framework operation may be maintained while the terminal 310 is disconnected from the network 340.

At the time of request, the asset(s) to be processed may not be available locally. Based on network conditions and budget, the media analysis and processing framework 332 may schedule and fetch the assets from a server or from another terminal via the network 340. Alternatively, processing may be assigned to and scheduled on another terminal already containing the assets of interest. Under system or resource pressure, analysis may be paused and intermediate results serialized. Analysis may be resumed when system conditions permit, or transferred to another terminal for completion.

The framework may crash or fail to generate results for certain assets. In order to avoid processing and failing again and again on the same assets, the framework can count the number of attempts in processing each asset. If the count value for a given asset reaches a threshold number of attempts, the framework can mark the asset or list it in a 'blacklist' in order to avoid processing the asset again, or reduce the frequency of attempts to process the asset. Blacklisted assets may be pardoned after a certain amount of time so that it may become eligible again.

When managing the processing across a number of devices, each device status may be monitored periodically and in the case of failure, tier scheduling can reroute the failed tasks to other devices.

In this disclosure and in the claims it is to be understood that reference to a terminal or wireless device is intended to encompass electronic devices such as mobile phones, controllers, tablet computers, personal computers, PDAs, and the like. A "terminal" or "wireless device" is intended to encompass any compatible mobile technology computing device that can connect to a wireless communication network. A wireless device further includes mobile phones, mobile equipment, mobile stations, user equipment, cellular phones, smartphones, handsets, or the like (e.g., Apple iPhone, other types of PDAs or smartphones), wireless dongles, remote alert devices, or other mobile computing devices that may be supported by a wireless network. The term "wireless device" may be interchangeably used and referred to herein as "wireless handset," "handset," "mobile device," "device," "mobile phones," "mobile equipment," "mobile station," "user equipment," "cellular phone," "smartphones," "monitoring device" or "phone."

Wireless devices may connect to a "wireless network" or "network" and are intended to encompass any type of wireless network to obtain or provide mobile phone and messaging services through the use of a wireless device, such as the Global System for Mobile Communication (GSM) network, Code-Division Multiple Access (CDMA) network, Long-Term Evolution (LTE) network, 5G (Fifth Generation), and the like that may utilize the teachings of the present application to transmit and process short message data services.

Reference in this disclosure to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the disclosure are not necessarily all referring to the same aspect, nor are separate or alternative aspects mutually exclusive of other aspects. Moreover, various features are described which may be exhibited by some aspects and not by others.

Similarly, various requirements are described which may be requirements for some aspects but not for other aspects.

Further in accordance with various aspects of the disclosure, the methods described herein are intended for operation with dedicated hardware implementations including, but not limited to processors, microprocessors, PCs, PDAs, SIM cards, semiconductors, application specific integrated circuits (ASIC), programmable logic arrays, cloud computing devices, and other hardware devices constructed to implement the methods described herein.

Aspects of the disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an inter-network, a backbone network (BBN), a global area network (GAN), the Internet, an intranet, an extranet, an overlay network, Near field communication (NFC), a cellular telephone network, a Personal Communications Service (PCS), using known protocols such as the Global System for Mobile Communications (GSM), CDMA (Code-Division Multiple Access), GSM/EDGE and UMTS/HSPA network technologies, Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wireless Fidelity (Wi-Fi), Bluetooth, and/or the like, and/or a combination of two or more thereof. The NFC standards cover communications protocols and data exchange formats, and are based on existing radio-frequency identification (RFID) standards including ISO/IEC 14443 and FeliCa. The standards include ISO/IEC 18092[3] and those defined by the NFC Forum.

The aspects in the disclosure may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels 350.

Aspects in the disclosure may be implemented in any type of mobile smartphones that are operated by any type of advanced mobile data processing and communication operating system, such as, e.g., an Apple™ iOS™ operating system, or the like.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

Aspects of the disclosure may be web-based. For example, a server may operate a web application in conjunction with a database. The web application may be hosted in a browser-controlled environment (e.g., a Java applet and/or the like), coded in a browser-supported language (e.g., JavaScript combined with a browser-rendered markup language (e.g., Hyper Text Markup Language (HTML) and/or the like)) and/or the like such that any computer running a common web browser (e.g., Safari™ or the like) may render the application executable. A web-based service may be more beneficial due to the ubiquity of web browsers and the convenience of using a web browser as a client (i.e., thin client). Further, with inherent support for cross-platform compatibility, the web application may be maintained and updated without distributing and installing software on each.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

While the system and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

We claim:

1. A media processing system, comprising:
    a memory to store data representing media assets and associated descriptors, and program instructions representing an application and services provided by the media processing system; and
    a processor to execute the program instructions, wherein, in response to a call from an application defining a plurality of requested services to be performed on an asset and that produce descriptors, the program instructions cause the processor to:
        determine a tiered schedule of processing operations to be performed upon the asset pursuant to the requested services based on a processing budget associated with the requested services, a complexity associated with the descriptors, and a resource limitation of the media processing system, wherein the batch of processing operations within a tier share a processing overhead for performing the processing operations, and iteratively execute the tiers of processing operations on a tier-by-tier basis to produce the descriptors, unless interrupted.

2. The system of claim 1, wherein the program instructions further cause the processor to determine the processing budget based on a priority of the descriptors.

3. The system of claim 2, wherein the program instructions further cause the processor to determine the processing budget based on a time delay after which the descriptors should be produced.

4. The system of claim 1, wherein the program instructions further cause the processor to identify a set of classes to be calculated from among a list of the classes supported by the media processing system based on an asset type.

5. The system of claim 1, wherein program instructions further cause the processor to organize the tiered schedule based on a priority of the descriptors and based on a time delay.

6. The system of claim 5, wherein the program instructions further cause the processor to adjust the tiered schedule based on conditions of the resource restricted device.

7. The system of claim 1, wherein the program instructions further cause the processor to distribute the tiered schedule across a network to another resource restricted device.

8. The system of claim 1, wherein the program instructions further cause the processor to count a number of attempts to process the asset, and if the number of attempts reaches a predetermined number, blacklist the asset.

9. The system of claim 8, wherein the program instructions further cause causes the processor to pardon the blacklisted asset after a predetermined amount of time.

10. The system of claim 1, wherein the execution is partly performed by hardware.

11. The system of claim 1, wherein the processor is throttled based on a priority of the asset or the processing budget of the asset.

12. The method of claim 1, further comprising:
interrupting the execution of processing operations when there are insufficient resources within the processing budget.

13. The method of claim 1, further comprising:
interrupting the execution of processing operations when there is a change in available resources or a change in required resources.

14. A method of processing media on a resource restricted device, the method comprising:
responsive to a call from an application identifying media assets to be processed, identifiers of processing operations to produce descriptors and to be performed on the media assets, and a processing budget associated with the call, generating a tiered schedule of the processing operations identified by the call according to a complexity associated with the descriptors and a resource limitation of the device wherein the processing operations within a tier share a processing overhead for performing the processing operations;
iteratively, on a tier-by-tier basis:
performing a tier of the processing operations according to the tiered schedule to produce the descriptors,
determining available resources for a next tier of processing operations,
if resources are not available for the next tier of processing operations, interrupting the schedule; and
otherwise, commencing a next iteration.

15. The method of claim 14, wherein the processing budget is generated based on a priority value for the media assets.

16. The method of claim 15, wherein the processing budget is generated further based on a time delay after which a descriptor should be produced.

17. The method of claim 16, further comprising identifying, with the descriptor, a set of classes to be calculated among a supported list of classes based on an asset type.

18. The method of claim 14, further comprising collecting a plurality of tiers to be performed on the media assets.

19. The method of claim 14, wherein generating the schedule of tiers is further based on a priority value.

20. The method of claim 19, wherein generating the schedule of tiers is further based on a time delay value.

21. The method of claim 14, further comprising counting a number of attempts to process a media asset, and if the number of attempts reaches a predetermined number, blacklist the media asset.

22. The method of claim 21, further comprising pardoning the blacklisted media asset after a predetermined amount of time.

23. The method of claim 14, wherein the performing is partly conducted with hardware.

24. The method of claim 14, further comprising throttling the performing based on a priority of the assets or the processing budget of the assets.

25. A method of processing media on a resource restricted device, the method comprising:
responsive to a call from an application identifying media assets to be processed, identifiers of processing operations to be performed on the media assets and a processing budget associated with the call, generating a tiered schedule of the processing operations identified by the call, the schedule of tiers also generated based on a complexity associated with computing a descriptor of a media asset and on a resource limitation associated with the resource restricted device;
iteratively, on a tier-by-tier basis:
performing a tier of the processing operations according to the tiered schedule,
determining available resources for a next tier of processing operations,
if resources are not available for the next tier of processing operations, interrupting the schedule, and
otherwise, commencing a next iteration.

26. The method of claim 25, wherein:
the call further identifies priorities of the processing operations; and
the schedule of tiers is generated based further on the priorities.

27. The method of claim 25, wherein the processing operations compute descriptors.

28. A non-transient computer readable medium having program instructions causing a processor to:
responsive to a call from an application identifying media assets to be processed, identifiers of processing operations to produce descriptors and to be performed on the media assets, and a processing budget associated with the call, generate a tiered schedule of the processing operations identified by the call according to a complexity associated with the descriptors and a resource limitation of a device executing the program instructions wherein the processing operations within a tier share a processing overhead for performing the processing operations;
iteratively, on a tier-by-tier basis:
perform a tier of the processing operations to produce the descriptors according to the tiered schedule, determine available resources for a next tier of processing operations, if resources are not available for the next tier of processing operations, interrupt the schedule, and otherwise, commence a next iteration.

29. The medium of claim 28, wherein the processing budget is generated based on a priority value for the media assets.

30. The medium of claim 29, wherein the processing budget is generated further based on a time delay after which a descriptor should be produced.

31. The medium of claim 30, further comprising identifying, with the descriptor, a set of classes to be calculated among a supported list of classes based on an asset type.

32. The medium of claim 31, further comprising collecting a plurality of tiers to be performed on the media assets.

33. The medium of claim 28, further comprising counting a number of attempts to process a media asset, and if the number of attempts reaches a predetermined number, removing the media asset from the schedule.

34. The medium of claim 33, further comprising returning the removed media asset to the schedule after a predetermined amount of time.

35. The medium of claim 28, wherein the performing is partly conducted with hardware.

36. The medium of claim 28, further comprising throttling the performing based on a priority of the assets or the processing budget of the assets.

* * * * *